(No Model.) 2 Sheets—Sheet 1.

B. W. ANNIN.
LOCOMOTIVE VELOCIPEDE.

No. 382,311. Patented May 8, 1888.

Witnesses.
S. F. Beardsley.
J. Jessen.

Inventor.
Bryant W. Annin.
By his Attorney.
Paul, Sanford & Merwin.

(No Model.) 2 Sheets—Sheet 2.

B. W. ANNIN.
LOCOMOTIVE VELOCIPEDE.

No. 382,311. Patented May 8, 1888.

Witnesses.
SJBeardslee.
J. Jessen.

Inventor,
Bryant. W. Annin,
By his Attorneys
Paul, Sanford & Merwin.

N. PETERS. Photo-Lithographer, Washington, D. C.

UNITED STATES PATENT OFFICE.

BRYANT W. ANNIN, OF MINNEAPOLIS, MINNESOTA.

LOCOMOTIVE-VELOCIPEDE.

SPECIFICATION forming part of Letters Patent No. 382,311, dated May 8, 1888.

Application filed January 23, 1888. Serial No. 261,613. (No model.)

*To all whom it may concern:*

Be it known that I, BRYANT W. ANNIN, of Minneapolis, in the county of Hennepin and State of Minnesota, have invented certain new and useful Improvements in Locomotive Tricycles or Velocipedes, of which the following is a specification.

My invention relates to improvements in storing and transmitting power for driving vehicles.

My invention consists, generally, in a spring-motor for vehicles, &c., comprising a series of springs mounted within a revolving case or cylindrical frame, the periphery of which is connected by gear-teeth or other suitable mechanism with the axle for revolving the driving wheel or wheels, each of the said springs being connected with the revolving case and with a separate spindle mounted in said case, and provided with a gear-wheel, which meshes with a gear common to the whole series and held upon a relatively-fixed axle, around which the case revolves.

My invention also consists in a device for winding the springs by means of a lever attached to the central axle and in a device operated by the winding-lever, whereby the case or frame in which the springs are located may be locked to the axle and the whole revolved together without unwinding the springs.

My invention further consists in the construction and arrangement, hereinafter described, and particularly pointed out in the claims.

Figure 1:
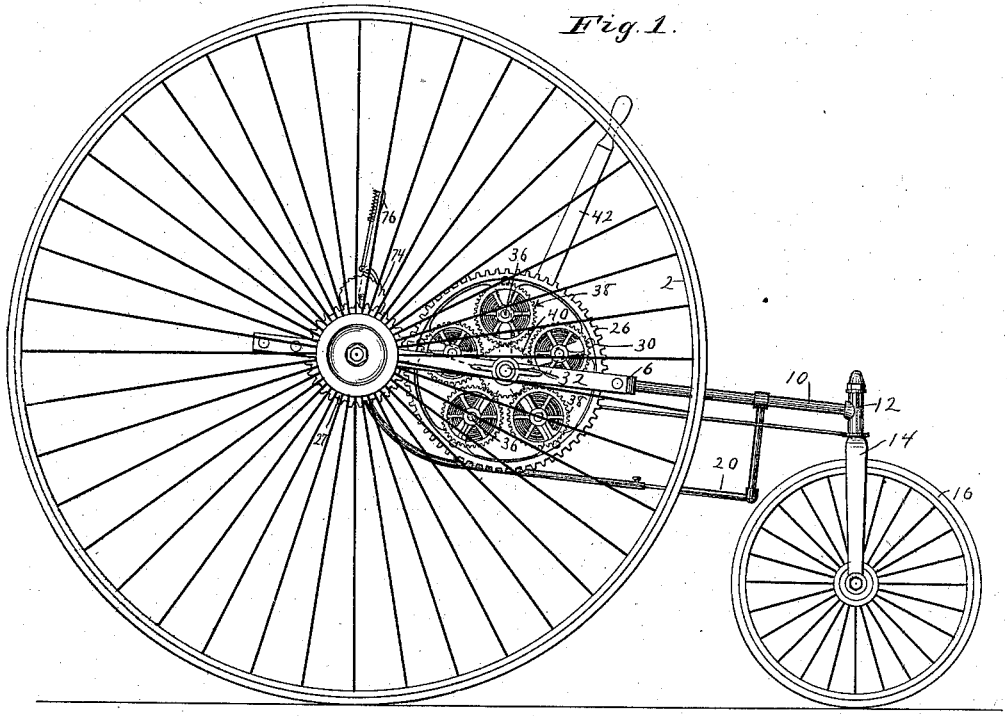
Figure 2:
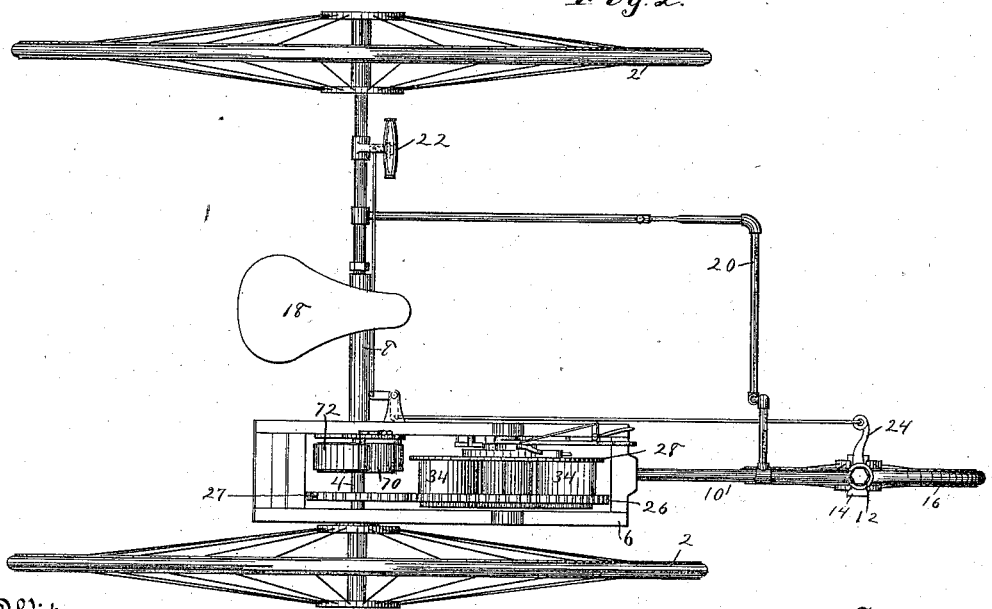
Figure 3:
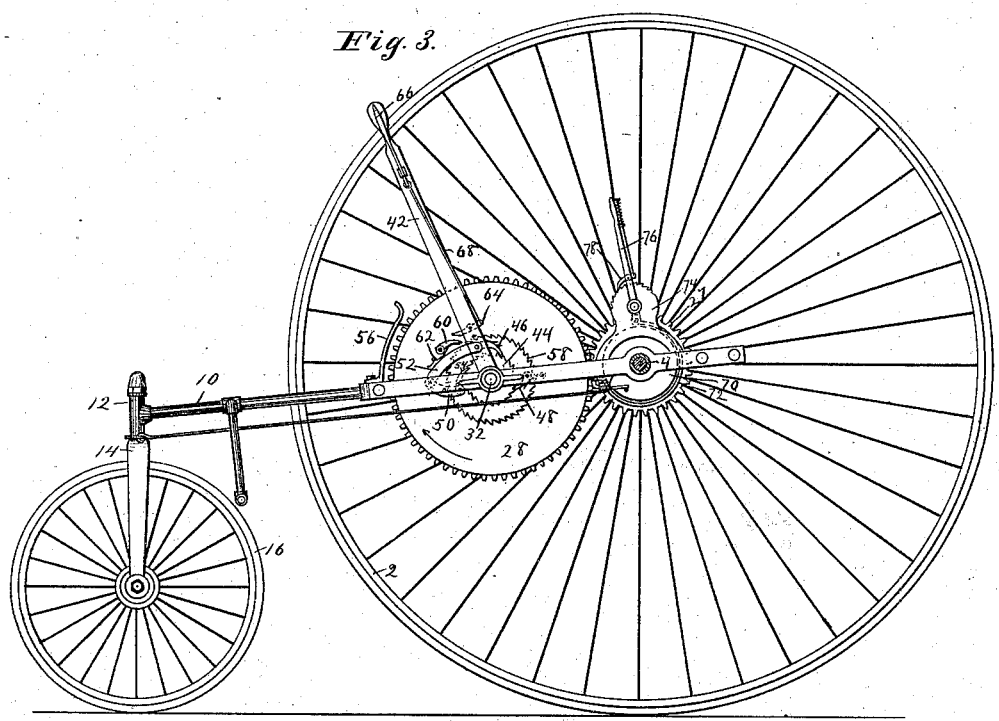
Figure 4:
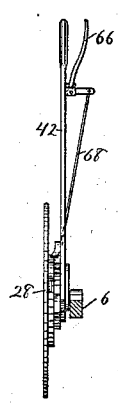
Figure 5:
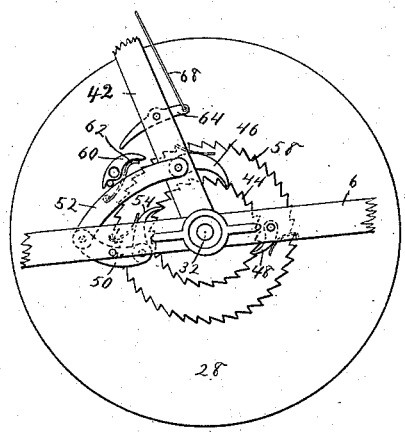

In the drawings which form part of this specification, Figure 1 is a side elevation of a tricycle with my improvement applied thereto. Fig. 2 is a plan view of the same. Fig. 3 is a longitudinal section showing the operation of the winding-lever. Figs. 4 and 5 are details.

In the drawings, 2 represents the main wheels of the vehicle. For convenience in curving, I prefer to allow the wheels to revolve independently of each other. The wheel upon one side of the machine is preferably used for the driving-wheel, and is secured to the shaft 4, which is journaled in the frame 6. A continuation, 8, of this axle may be constructed in any suitable manner and permanently attached to the frame 6 and extend across the machine, and the other wheel may be secured at the extremity of this extension and revolve freely thereon.

The frame 6 is arranged to support the working portions of the machine, and a bar, 10, is preferably attached to the front of the said frame and extends forward and is secured to the hub 12, in which the swivel-yoke 14 is journaled, supporting the guide-wheel 16. A seat, 18, is preferably mounted upon the extension of the axle, and a foot-rest, 20, is secured to the said extension and to the bar 10.

A suitable steering device is provided, consisting, preferably, as follows: A handle, 22, is placed within convenient reach of the operator and supported upon the extension 8. A short shaft extends downward from this handle and connects by means of suitable rods and bell-cranks with the lever 24 on the yoke 14, for the purpose of steering or guiding the machine.

I provide a case or frame preferably formed of the outer plate, 26, and the inner plate, 28. These plates are preferably made circular in form, and are secured together by suitable columns or shoulder-bolts, 30, secured to the two plates and holding them firmly at the proper distance apart. The case thus formed of these two plates revolves loosely upon the axis or shaft 32, held in bearings in the frame 6. The periphery of the outer plate, 26, is preferably constructed with gear-teeth thereon, which are arranged to mesh with a pinion, 27, on the driving-shaft 4. I do not confine myself, however, to this construction, as any suitable means may be used to transmit the power from the revolving case to the driving-shaft.

The springs 34, which furnish the motive power for propelling the machine, are preferably located in the revolving case between the plates 26 and 28. There may be any convenient number of these springs placed about the central axis. Each spring is provided with a spindle, 36, which is free to revolve in bearings in the plates 26 and 28. The inner ends of the springs 34 are secured to the spindle 36 and the outer ends are secured to the revolving case, preferably attaching them to the columns 30. A gear, 38, is mounted on each of the spindles 36 and meshes with a gear, 40, rigidly secured to the axis or shaft 32.

It will be seen that when the springs 34 are wound the tension of each of the springs will exert a pressure upon its axis or spindle 36, causing it to revolve the gear 38 upon this spindle, which, meshing with the gear 40 upon a shaft which is held stationary, will cause the gears 38 to revolve around the central gear, 40, with a sun-and-planet movement, and thus impart a revolving motion to the case and through it to the axle 4, to which it is geared.

I provide a simple means for winding the springs, which is as follows: A lever, 42, swings freely upon the shaft 32 and extends upward within convenient reach of the operator. A ratchet-wheel, 44, is secured to the shaft 32, and a pawl 46 is attached to the lever and meshes with the said ratchet. Another pawl, 48, is attached to the frame 6, and also meshes with the ratchet 44 to prevent it from turning backward. As the lever 42 is operated, the shaft 32 is revolved in the direction denoted by the arrow in Fig. 3. This motion revolves the gear 40, secured upon the said shaft, and this in turn revolves the gears 38, meshing therewith upon the spindles to which the springs 34 are attached. This motion being in the opposite direction to the tension of the springs will wind them about the spindle and increase said tension.

I prefer to attach the lever 42 to the ratchet 44 in such a manner as to utilize the movement of said lever in both directions for winding the springs. For this purpose I provide an oscillating lever, 50, fulcrumed in the frame 6, the outer end connected to the lever 42 by the rod 52, and the inner end provided with a pawl, 54, meshing with the ratchet-wheel 44. It will be seen that a forward motion of the lever 42 oscillates the lever 50, and the pawl 54, attached thereto, meshing with the ratchet 44, causes a partial revolution of the said ratchet. The ratchet 46, attached to the lever, follows the said lever over the teeth of the ratchet and is in position to revolve the said ratchet when the motion of the lever is reversed, so that a continuous motion of the ratchet is obtained for winding the springs by a reciprocatory motion of the lever. I prefer to provide a stop, 56, secured to the frame and extending upward a suitable distance, the end of which acts as a stop to the lever 42 in its forward motion and prevents it from being thrown forward too far for convenience in operating it.

In case the machine is used on a downgrade, the action of the springs is not required, and to prevent the unnecessary consumption of spring-power I provide a means for locking the revolving case containing the springs with the central shaft, 32, and allow the whole to revolve together. The pinion 27 on the wheel-shaft then becomes the driver, and the shaft 32 and the frame or case containing the springs revolve in the journal-bearing in the frame. The relative position of the gears 36 and the central gear, 40, will remain the same, and no unwinding of the springs will occur. I obtain this result by placing a ratchet, 58, upon the shaft 32, to which it is secured. A pawl, 60, is secured to the plate 28 and arranged to mesh with the said ratchet 58. When this pawl and ratchet are in contact, the action of the springs, which is in the direction of the arrow in Fig. 3, is against the teeth of the ratchet 58, and this being fast to the shaft 32 will cause the whole to revolve, with the result before mentioned. It is necessary, however, in order to utilize the spring-power, to have this ratchet disconnected at all times except when the vehicle is being driven by its own gravity; and in order to prevent any accidental contact I provide a spring, 62, acting upon the under side of the said pawl to throw it out of contact with the ratchet. I also provide a finger, 64, fulcrumed upon the lever 42 and operated by a latch, 66, upon the upper portion of the lever 42, and connected to the said finger by the rod 68. The free end of the finger is arranged to come in contact with the pawl 60, and by drawing the latch toward the lever this free end of the said finger will be depressed and force the pawl into contact with the ratchet 58. The forward pressure exerted by the springs upon the end of the pawl will be sufficient to hold the said pawl in contact with the ratchet against the action of the spring 62. When, however, it is desired to release this pawl and again use the spring-power, the lever 42 is operated, as in the winding process. This advances the ratchet 58 and relieves the pressure between it and the pawl, and the spring 62 will act against the pawl and throw it out of the line of the ratchet-teeth, and it will thus remain until again thrown into contact by the finger 64.

I prefer to provide a means for retarding, when desired, the motion of the driving-shaft. A friction-pulley, 70, is secured to the shaft 4, and a band, 72, preferably of metal, partially surrounds the said pulley. One end of this band is secured to the frame 6 or to a projecting plate, 74, attached to said frame. The opposite end of the band is secured to the end of a lever, 76, fulcrumed in the said plate 74. The upper portion of the plate is semicircular in form and concentric with the fulcrum of the lever. This portion of the plate is serrated, and a pawl, 78, attached to the lever 76, meshes with the teeth thus formed. An operating-rod is provided upon the lever for throwing out the pawl.

To set the brake upon the machine, the lever 76 is forced backward, partially revolving upon its fulcrum and drawing the end of the band 72 tightly about the friction-pulley 70, and thus retarding the motion. Any required amount of friction may be obtained in this way and the brake set at any desired point by the action of the pawl 78 in contact with the notches or teeth on the plate 74.

I claim as my invention—

1. In a motor of the class described, the combination, with the driving-shaft, of a revolving case or frame connected to and operating said driving-shaft, a series of springs mounted upon shafts or spindles journaled in said case, and a series of gear-wheels upon said spindles and meshing with a central and relatively-stationary gear, whereby the action of the springs will be exerted to revolve the said case or frame about its axis, substantially as described.

2. The combination, in a vehicle of the class described, with the driving-shaft and the spring-actuated frame or case connected with and revolving said driving-shaft, of the central shaft about which the said frame revolves, a lever attached to and arranged to operate said shaft, a gear also attached to said central shaft, and a series of gears located about and meshing with said central gear and secured to the spindles of the actuating-springs, whereby by operating the lever and revolving the central shaft the spindles of the springs are revolved and the springs rewound, substantially as described.

3. The combination, in a vehicle of the class described, with the driving-shaft 4, and the gear 27, secured thereto, of the gear 26, revolving about the shaft 32 and meshing with the gear 27, a gear, 40, upon the shaft 32, the gears 38, mounted upon spindles journaled in the plate or gear 26, and common to and meshing with the gear 40, the springs 34, attached to the gear 26 and to the spindles and exerting pressure to revolve said spindles, and means, as a ratchet, 48, for retaining the shaft 32 in a stationary position in order that the springs 34 may exert their power to revolve the gear 26, substantially in the manner and for the purpose described.

4. In a vehicle of the class described, the combination, with the spring-propelling device consisting of the series of springs held in a revolving case or frame, the spindles of said spring being provided with a gear meshing with a central and independent gear upon a shaft, 32, and the locking device consisting of a ratchet secured to the shaft 32, and a pawl secured to the revolving case, whereby when the said pawl engages the ratchet the shaft 32 and the gear attached thereto will be locked to and caused to revolve with the said case and the action of the springs will be suspended, substantially as described.

5. In a vehicle of the class described, the combination, with the spring-propelling device, consisting of the springs 34, the spindles 36, upon which the said springs are mounted, the gears 38, secured to said spindles, and the gear 40, secured upon the central shaft, 32, and meshing with the gears 38, of the ratchet 58, secured to the shaft 32, the pawl 60, secured to the revolving frame or case, the spring 62 for holding said pawl in suspension, and a device, as the finger 64, operated by a suitable latch, 66, to force the pawl into engagement with the ratchet, substantially as described.

BRYANT W. ANNIN.

Witnesses:
R. H. SANFORD,
S. J. BEARDSLEE.